United States Patent
Brandl et al.

(10) Patent No.: US 9,647,463 B2
(45) Date of Patent: May 9, 2017

(54) CELL BALANCING MODULE AND METHOD IN VOLTAGE BALANCING DEVICE FOR A STACK OF BATTERIES WHICH COMPARES THE CELL VOLTAGES TO A CODED REFERENCE VOLTAGE DERIVED FROM AT LEAST TWO REFERENCE VOLTAGES

(75) Inventors: Manfred Brandl, Gratwein (AT); Sandeep Vernekar, Karwar (IN); Vijay Ele, Hyderabad (IN); Sudhakar Singamala, Hyderabad (IN); V. Veeresh Babu, Hyderabad (IN)

(73) Assignee: AMS AG, Unterpremstaetten (AT)

( * ) Notice: Subject to any disclaimer, the term of this patent is extended or adjusted under 35 U.S.C. 154(b) by 317 days.

(21) Appl. No.: 13/985,277

(22) PCT Filed: Feb. 14, 2012

(86) PCT No.: PCT/EP2012/052490
§ 371 (c)(1),
(2), (4) Date: Oct. 22, 2013

(87) PCT Pub. No.: WO2012/110497
PCT Pub. Date: Aug. 23, 2012

(65) Prior Publication Data
US 2014/0035532 A1 Feb. 6, 2014

(30) Foreign Application Priority Data
Feb. 15, 2011 (EP) .................................... 11154561

(51) Int. Cl.
*H02J 7/00* (2006.01)
*B60L 11/18* (2006.01)
*H01M 10/42* (2006.01)

(52) U.S. Cl.
CPC ............. *H02J 7/00* (2013.01); *B60L 11/1866* (2013.01); *H02J 7/0014* (2013.01);
(Continued)

(58) Field of Classification Search
CPC ...... H02J 7/0014; H02J 7/0016; H02J 7/0018; H02J 7/0019
(Continued)

(56) References Cited

U.S. PATENT DOCUMENTS 4,238,721 A * 12/1980 DeLuca ................ H02J 7/0016
320/122
5,432,429 A * 7/1995 Armstrong, II .... G01R 31/3648
320/136

(Continued)

FOREIGN PATENT DOCUMENTS

EP 1289096 A2 3/2003
JP 2002281685 A 9/2002
(Continued)

OTHER PUBLICATIONS

"Serial Peripheral Interface Bus: Advantages," Wiki, Published Jun. 26, 2010, Accessed Online Feb. 16, 2016, https://web.archive.org/web/20100626063508/http://en.wikipedia.org/wiki/Serial_Peripheral_Interface_Bus#Pros_and_cons_of_SPI.*
(Continued)

*Primary Examiner* — Robert Grant
*Assistant Examiner* — John Trischler
(74) *Attorney, Agent, or Firm* — McDermott Will & Emery LLP (57) ABSTRACT

The invention relates to a cell balancing module, particularly for voltage balancing of a stack of batteries. The cell balancing module comprises an interface (SPI, VrefH, VrefL) to input a coded reference voltage (Vref) and input nodes (In1, . . . , InN) for connecting a stack of energy storage cells (BAT1, . . . , BATn). A switching unit (SW) is connected to each of the input nodes (In1, . . . , InN) and a local balancing unit (loc) coupled to the switching unit (SW) and the interface (SPI, VrefH, VrefL). The local balancing
(Continued)

unit (loc) is designed to compare the coded reference voltage (Vref) with cell voltages (VBAT1, ..., VBATn) of the stack of energy storage cells (BAT1, ..., BATn) to be connected and to charge balance the stack of energy storage cells (BAT1, ..., BATn) to be connected depending on the comparison of coded reference voltage (Vref) and cell voltages (VBAT1, ..., VBATn). The invention also relates to a voltage balancing device and method for cell balancing, particularly for voltage balancing of a stack of batteries.

21 Claims, 5 Drawing Sheets

(52) U.S. Cl.
CPC .......... *H02J 7/0016* (2013.01); *H02J 7/0018* (2013.01); *H02J 7/0019* (2013.01); *H01M 2010/4271* (2013.01)

(58) Field of Classification Search
USPC ................................ 320/122, 120, 128, 153
See application file for complete search history.

(56) References Cited

U.S. PATENT DOCUMENTS

| | | | | |
|---|---|---|---|---|
| 5,664,060 A * | 9/1997 | Jarrett | G11C 27/005 | 379/88.22 |
| 5,770,938 A * | 6/1998 | Kao | H02J 7/0081 | 320/148 |
| 5,952,815 A * | 9/1999 | Rouillard | H02J 7/0016 | 320/116 |
| 6,081,095 A | 6/2000 | Tamura et al. | | |
| 6,121,751 A * | 9/2000 | Merritt | H02J 7/0018 | 320/116 |
| 6,271,646 B1 * | 8/2001 | Evers | H02J 7/0016 | 320/120 |
| 6,377,028 B1 * | 4/2002 | Armstrong, II | H02J 7/0047 | 320/136 |
| 6,531,848 B1 * | 3/2003 | Chitsazan | H02J 7/0016 | 320/153 |
| 7,193,392 B2 * | 3/2007 | King | B60L 11/185 | 320/118 |
| 7,203,728 B2 * | 4/2007 | Lum | G07G 1/12 | 709/208 |
| 7,564,216 B2 | 7/2009 | Carrier et al. | | |
| 7,683,579 B2 * | 3/2010 | Kim | H02J 7/0029 | 320/132 |
| 7,816,892 B2 * | 10/2010 | Chen | H02J 7/0072 | 320/162 |
| 8,054,034 B2 * | 11/2011 | Lim | H02J 7/0016 | 320/101 |
| 8,384,352 B2 * | 2/2013 | Shiu | H01M 10/4207 | 320/118 |
| 8,509,318 B2 * | 8/2013 | Tailliet | G06F 13/4295 | 320/145 |
| 8,598,840 B2 * | 12/2013 | Yount | B60L 3/0046 | 320/107 |
| 2004/0135544 A1 * | 7/2004 | King | B60L 11/185 | 320/116 |
| 2005/0024015 A1 * | 2/2005 | Houldsworth | H02J 7/0016 | 320/119 |
| 2006/0071643 A1 * | 4/2006 | Carrier | H01M 10/4257 | 320/132 |
| 2006/0284614 A1 * | 12/2006 | Kim | H02J 7/0077 | 324/149 |
| 2008/0090133 A1 * | 4/2008 | Lim | H02J 7/0016 | 429/50 |
| 2008/0185995 A1 * | 8/2008 | Carrier | H02J 7/0021 | 320/134 |
| 2008/0252257 A1 * | 10/2008 | Sufrin-Disler | B60L 3/0046 | 320/118 |
| 2008/0278969 A1 * | 11/2008 | Bolz | H02J 7/0014 | 363/17 |
| 2009/0045775 A1 | 2/2009 | Popescu Stanesti et al. | | |
| 2009/0085516 A1 * | 4/2009 | Emori | B60L 3/0046 | 320/118 |
| 2009/0146610 A1 * | 6/2009 | Trigiani | H02J 7/0018 | 320/119 |
| 2009/0267566 A1 * | 10/2009 | Yano | B60L 11/1861 | 320/118 |
| 2010/0026241 A1 * | 2/2010 | Kang | H02J 7/0016 | 320/118 |
| 2010/0085009 A1 | 4/2010 | Kang et al. | | |
| 2010/0109610 A1 * | 5/2010 | Houldsworth | H02J 7/0016 | 320/132 |
| 2010/0141209 A1 | 6/2010 | Shiu et al. | | |
| 2010/0264878 A1 * | 10/2010 | Ueda | H02J 7/0016 | 320/116 |
| 2010/0283473 A1 * | 11/2010 | Vandensande | H02J 7/0021 | 324/434 |
| 2010/0327806 A1 * | 12/2010 | Brisebois | G01R 31/3658 | 320/116 |
| 2011/0025270 A1 * | 2/2011 | Nakanishi | B60L 11/1851 | 320/116 |
| 2011/0127962 A1 * | 6/2011 | Murao | H02J 7/0016 | 320/118 |
| 2011/0127963 A1 * | 6/2011 | Murao | H02J 7/0016 | 320/118 |
| 2011/0221394 A1 | 9/2011 | Shigemizu et al. | | |
| 2011/0248675 A1 * | 10/2011 | Shiu | H01M 10/4207 | 320/118 |
| 2011/0254502 A1 * | 10/2011 | Yount | B60L 3/0046 | 320/107 |
| 2012/0025769 A1 * | 2/2012 | Kikuchi | B60L 3/0046 | 320/118 |
| 2012/0119709 A1 * | 5/2012 | Mull | H02J 7/0016 | 320/149 |
| 2012/0175953 A1 * | 7/2012 | Ohkawa | B60L 3/0046 | 307/18 |
| 2013/0241471 A1 * | 9/2013 | Arai | H02J 7/0016 | 320/107 |
| 2014/0042973 A1 * | 2/2014 | Kawahara | H01M 10/441 | 320/118 |

FOREIGN PATENT DOCUMENTS

| | | |
|---|---|---|
| JP | 2002374633 A | 12/2002 |
| JP | 2003070179 | 3/2003 |
| JP | 201098824 | 4/2010 |
| JP | 2011019329 A | 1/2011 |

OTHER PUBLICATIONS

"Daisy Chain," SearchNetworking.com, Published Jan. 7, 2011, Accessed Online Feb. 16, 2016, https://web.archive.org/web/20110107003805/http://searchnetworking.techtarget.com/definition/daisy-chain.*

Analog to Digital (A/D) Converter in "Analog to Digital (A/D) Converter," Rui Lam, University of California Berkeley, Published Sep. 14, 2003, Accessed Online Feb. 12, 2016, p. 1 http://courses.me.berkeley.edu/ME1 02B/Past_Proj/f03/Proj6/TMS320LF2407A_Documents/Intro-ADC.pdf.*

"State of Charge Determination," Electropaedia, mpoweruk, Published May 9, 2008, Accessed Apr. 2, 2015, http://web.archive.org/web/20080509145838/http://www.mpoweruk.com/soc.htm.*

DENSO Corporation, "DENSO Develops Battery Monitoring Unit for Lithium-ion Batters", http://www.globaldenso.com/en/newsreleases/100112-01.html, Jan. 12, 2010, pp. 1-2.

* cited by examiner

CELL BALANCING MODULE AND METHOD IN VOLTAGE BALANCING DEVICE FOR A STACK OF BATTERIES WHICH COMPARES THE CELL VOLTAGES TO A CODED REFERENCE VOLTAGE DERIVED FROM AT LEAST TWO REFERENCE VOLTAGES

The present invention relates to a cell balancing module and a voltage balancer device, particularly for voltage balancing of a stack of batteries. Furthermore, the invention relates to a method for voltage balancing, particularly for voltage balancing of a stack of batteries.

Batteries are essential to mobile current supply in many fields. They come in various types like lithium ion, lithium polymer, ultra capacitors and double layer capacitors to name but a few examples. Similarly diverse are possible applications in which batteries find use. In order to adapt to given current supply needs usually energy storage units are stacked individual cells. Voltages of individual cells sum up to a level required for a given application. Usually final stack voltages range around 12 V for mobile computers, power tools and toys. Electric bikes already need 24 V in general. Around 200 V are necessary to drive hybrid electric vehicles and even 600 V to 1000 V are required for electric vehicles. Especially the latter battery packs are expensive, need careful treatment and charging or discharging according to the battery characteristics to ensure long battery life, healthiness and safety.

In particular, complex battery stacks require accurate charge balancing in order to avoid overcharge or over-depletion of individual cells within the battery pack. Today such charge balancing is performed by sophisticated battery management electronics. Individual cell voltages are measured by precise data acquisition devices. These voltages are reported through level shifters or galvanic isolation to a central unit which then computes a state of charge for each individual cell. In common charge balancing procedures those cells which have more charge than the weakest cell in the stack will be exposed to a resistive load in order to passively convert the stored excess energy to heat until all battery cells match the weakest cell in capacity.

Software algorithms have been developed in the art to manage cell balancing and allow for integrated solutions in integrated circuits. Depending on the quality of such control systems batteries can be rather safely charged and discharged close to their intended storage capacity. However, these solutions demand complicated electronics and implementation of complex algorithms. As a consequence prior art cell balancing and battery management units are expensive and need rather large amount of space when used in integrated circuits.

It is an object of the present invention to provide a cell balancing module, voltage balancer device and method for voltage balancing which allows for accurate and precise charge balancing combined with easier integration.

This object is solved by the independent claims. Further embodiments are subject to dependent claims.

In one embodiment a cell balancing module, particularly for voltage balancing of a stack of batteries comprises an interface to input a coded reference voltage. The coded reference voltage is derived from at least two reference voltages. The module further comprises input nodes for connecting a stack of energy storage cells. A switching unit is connected to each of these input nodes. A local balancing unit is connected to the nodes and coupled to both the switching unit and the interface.

In operation of the cell balancing module a stack of energy storage cells is connected to the input nodes. The stack of energy storage cells comprises at least two energy storage cells to be connected to the input nodes. Preferably energy storage cells are rechargeable batteries. Each energy storage cell has an individual cell voltage. A sub-stack denotes a stack of energy storage cells being a member of a larger stack of energy storage cells. Its voltage is denoted sub-stack voltage in the following. A total system voltage characterizes the voltage from a series connection of individual batteries in a stack.

The local balancing unit is designed to compare the coded reference voltage with cell voltages of the stack of energy storage cells. Alternatively or additionally, instead of individual cell voltages of energy cells cell balancing may also be performed on sub-stack voltages across a given sub-stack of energy storage cells. Furthermore, the local balancing unit comprises means to perform charge balance of the stack of energy storage cells depending on the comparison of coded reference voltage and cell voltages or sub-stack voltages.

In charge balancing the stack of batteries the cell balancing module first determines an amount of charging or discharging a given one of the energy storage cells or the complete stack or sub-stack. The amount is determined from the comparison of coded reference voltage and cell or sub-stack voltages. In this respect a convenient reference voltage may be an average cell voltage defined as the total system voltage divided by the number of energy storage cells in the stack. Preferably, possible system charge losses or other distortions are accounted for. Another reference may be a minimum or maximum stack voltage corresponding to any given energy storage cell in the stack. In general, user determined values are possible just as well.

Either way the coded reference voltage is derived from the chosen or measured reference voltages and may be provided at the cell balancing module or more precisely the interface. The coded reference voltage can either be an analog or digital representation of the reference voltage. Preferably, the coded reference voltage gets encoded in such a way to allow for reliably reproducing the actual reference voltage. For example, reliability and data integrity can be maintained by using cyclic redundancy check and dyadic polynomials or the like.

Preferably, the cell balancing module is integrated in an integrated circuit. Charge balancing can be implemented using electronic elements such as switches and comparators. This allows for rather relaxed space requirements on the final die. By using a plurality of input nodes a large number of generally chained energy storage cells can be connected. Furthermore, by using the coded reference voltage, preferably coded in a digital way, the cell balancing module is largely insensitive to electromagnetic disturbances during the transmission and reception of the coded reference voltage and charge balancing itself. The suggested cell balancing module can also be used together with active or passive charge balancing.

In a further embodiment the interface is a serial interface, in particular a serial peripheral interface.

By using the interface according to a serial protocol or standard the transmission and reception of the coded reference voltage to the cell balancing module is largely insensitive to electromagnetic interferences and disturbances. This is especially important when using the stack of energy storage cells in an electronic noisy environment such as in an electric vehicle. In order to further improve the precision, the reliability and data integrity in the serial interface may be maintained by using appropriate CRC polynomials (cyclic redundancy check). Corresponding means may be implemented in the local balancing unit.

In a further embodiment the local cell balancing unit comprises at least one comparator which is coupled to the switching unit via a first input. Furthermore, a control logic is connected to the interface, to an output of the at least one comparator and to the switching unit.

The at least one comparator compares the coded reference voltage to be provided at a second input of the at least one comparator and the cell or sub-stack voltages of the stack of energy storage cells to be connected. The comparison may result in a logic signal or be represented by a comparison voltage which in turn may be subject to further processing. The control logic controls the switching unit so as to electrically connect the stack of energy storage cells to the first input of the at least one comparator, respectively.

In a further embodiment the local balancing unit comprises a digital-to-analog converter. The digital-to-analog converter is connected to the second input of the at least one comparator and connected to the control logic via a control channel. The digital-to-analog converter is designed to convert the coded reference voltage into an analog local reference voltage to be provided at the second input of the at least one comparator.

Alternatively, the local balancing unit may comprise an analog-to-digital converter which is coupled to the switching unit such as to convert the cell or sub-stack voltages into digital local cell or sub-stack voltages to be provided at the first input of the at least one comparator. Said analog-to-digital converter is controllably connected to the control logic.

By either using the digital-to-analog or analog-to-digital converter analog or digital comparison can be implemented, respectively. If used in noisy environment or with large stack of energy storage cells digital comparison is preferable as it is less sensitive to distortions and interference.

In a further embodiment the cell balancing module comprises means to synchronize its operation depending on an external trigger signal. The trigger signal may be applied via the interface and alternatively originate from an external or internal controller module. Especially in the case of more than a single cell balancing module, charge balancing may be synchronized to the trigger signal or, if the trigger signal is provided to more balancing modules, even between several cell balancing modules. Operations to be synchronized by the trigger comprise charge balancing in a single cell balancing module, e.g. if more than one comparator is used, or in a plurality of cell balancing modules. In other words balancing by comparison of cell voltages can be synchronized within the balancing modules as well as across the modules.

In a further embodiment, the interface comprises input and output means to establish a daisy chain connection to further cell balancing modules. The daisy chain connection allows connecting a plurality of individual cell balancing modules. Only a single module, however, is connected to a controller or similar units to receive the coded reference voltage. Furthermore, the daisy chain connection is designed to work together with the interface of the cell balancing modules such that data can be transferred in a bidirectional manner between the modules.

In a further embodiment the local balancing unit comprises means to derive an amount of charge balance of the stack of energy storage cells. In this way it is possible to determine, based on a local balance voltage provided at the output of the at least one comparator, whether to charge or discharge the stack of energy storage cells.

Preferably, the at least one comparator provides a control signal indicating the amount of charge balance. That control signal may be directly proportional to the amount of charge balance or, if for example digital implementation is used, may be a binary signal. This way the amount of charge balance could be set to a fixed value by which charging and discharging is executed.

In one embodiment a voltage balancer device, particularly for voltage balancing of a stack of batteries, comprises at least one cell balancing module according to the principle described above. Furthermore, there are means, like a controller module, for encoding the coded reference voltage which are connected to the interface at the least one cell balancing module.

Preferably, the means for coding a coded reference voltage are designed to measure a total system voltage. However, alternatively it may also be possible to define different voltages such as a minimum or maximum target balancing voltage. Preferably, possible system charge losses or other distortions are accounted for. Another reference may be a minimum or maximum stack voltage corresponding to any given energy storage cell in the stack. User determined values are possible as well.

The coded reference voltage is derived from one of the chosen or measured reference voltages, preferably by means of a battery controller. An appropriate communication line provides the coded reference voltage at the cell balancing module, in particular via connection to the interface. The coded reference voltage can either be an analog or digital representation of the reference voltage. Preferably, the coded reference voltage is encoded in such a way to reliably reproduce the actual reference voltage. For example, reliability and data integrity can be maintained by using cyclic redundancy check and dyadic polynomials or the like.

Preferably, the cell balancing module is integrated in an integrated circuit. Further parts of the voltage balancer device may also be integrated so as to set up the device in a modular fashion. However, it is also possible to integrate the complete device into a single die.

The charge balancing implemented by the voltage balancer device can be set up using electronic elements such as logic, switches and comparators. This allows for rather relaxed space requirements on the final die. By using a plurality of input nodes a large number of, generally, chained energy storage cells can be connected. Furthermore, by using the coded reference voltage, preferably coded in a digital way, the cell balancing module is largely insensitive to electromagnetic disturbances during the transmission and reception of the coded reference voltage and charge balancing itself. The suggested cell balancing modules can be used together with active or passive charge balancing, e.g. by means of resistive heat dissipation or power conversion, respectively.

In a further embodiment there are a number of n cell balancing modules interconnected by way of a daisy chain via their respective interfaces. Each of these n cell balancing modules may be connected to a stack or sub-stack of energy storage cells.

In a further embodiment the voltage balancer device comprises a first cell balancing module which is designed to be a master module in the daisy chain of n cell balancing modules. The other cell balancing modules are designed to be slave modules. The preferred daisy chain connection between the master module and slave modules is of serial interface type, in particular a synchronous serial data bus based on the serial peripheral interface or any custom serial protocol.

The modules communicate in a master/slave mode where the master module initiates a data frame. The multiple slave devices are interconnected. Each slave is assigned a unique address by address allocation procedure by the master. The master may receive the coded reference voltage and, in turn, transmit the reference to the slaves. The slaves can, using the same interface, acknowledge slave receipt. Additionally, operation, e.g. charge balancing may be synchronized via the interface using the trigger signal broadcasted via the master module. In other words balancing by comparison of cell voltages can be synchronized within the balancing modules as well as across the modules.

In a further embodiment the master is designed to simultaneously send the coded reference voltage to the slave modules via the daisy chain and synchronize charge balancing in the charge balancing modules by controlling the slave modules using the trigger signal to be applied by the respective interfaces.

A further embodiment relates to a power converter to charge and/or to a resistor to discharge the stack of energy storage cells. By using the power converter it is possible to perform active charge balancing, e.g. by charging an energy storage cell or a stack of energy storage cells by a certain amount. Using the resistor it is possible to conduct passive charge balancing, e.g. by dissipating a certain amount of charge as heat in the resistor.

In a further embodiment the means for coding the coded reference voltage comprise a voltage measurement circuit designed to determine the total system voltage of the stack of energy storage cells to be connected. And there is a further analog-to-digital converter connected to the voltage measurement circuit and designed to convert the overall voltage into a digital representation. A control circuit is connected to the further analog-to-digital converter. The further analog-to-digital converter is designed to code the coded reference voltage based on the representation. The encoding procedure relates to the requirements of the interface, e.g. serial interface protocol. The control circuit is connected to at least one cell balancing module to transmit the coded reference voltage.

In an embodiment of a method for voltage balancing, particularly for voltage balancing of a stack of batteries, a reference voltage is encoded. Then, the coded reference voltage is transmitted to at least one cell balancing module connected to a stack of energy storage cells. Respective cell or sub-stack voltages of the stack of energy storage cells at the least one balancing module are compared to the coded reference voltage. Charges are balanced by adjusting the respective cell or sub-stack voltages depending on the comparison between the respective cell and sub-stack voltages and the coded reference voltage.

In a further embodiment, the transmission of the coded reference voltage to the at least one cell balancing module or to further cell balancing modules is synchronized. Also cell balancing may be synchronized. As synchronization signal an external or internal trigger signal is used.

By synchronization it is possible to render charge balancing largely insensitive to electromagnetic disturbances and interferences. This is mostly due to comparison with the same coded reference voltage. In other words balancing by comparison of cell voltages can be synchronized within the balancing modules as well as across the modules.

The text below explains the invention in detail using exemplary embodiments with reference to the drawings. Like reference numerals may be used to describe similar elements and are not repeated in each description of the figures.

In the following, the principle presented above is described in further detail with respect to drawings, in which exemplary embodiments are presented. Like reference numerals designate corresponding similar parts or elements.

Figure 1:
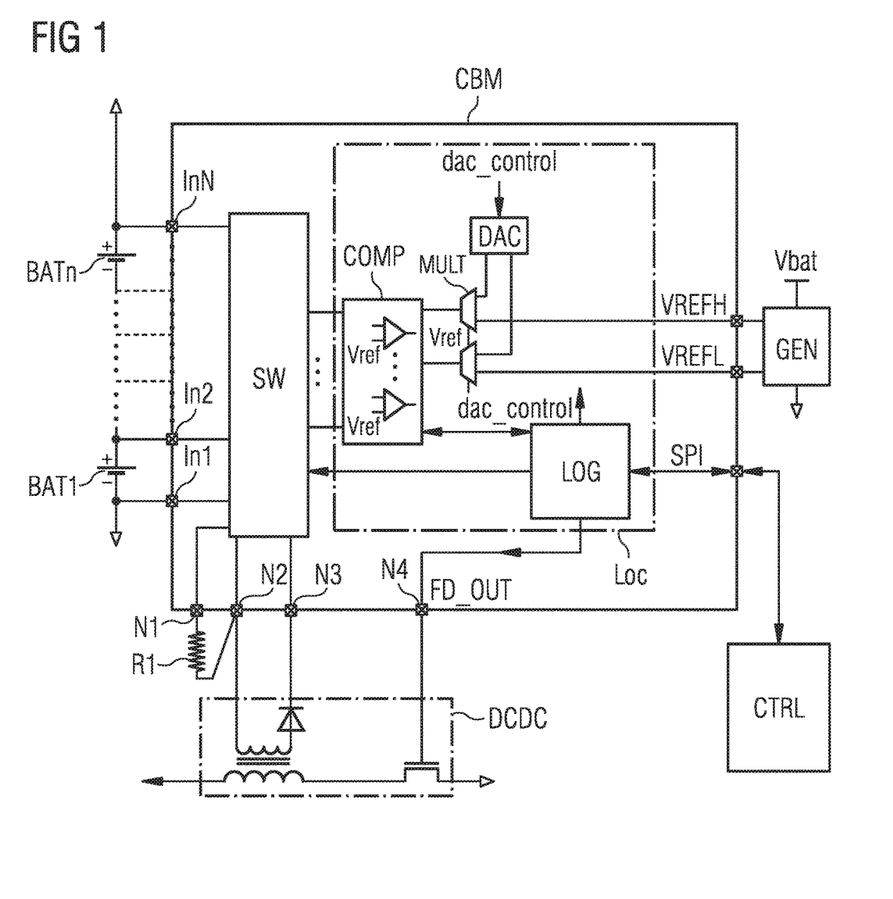
FIG. 1 shows a first exemplary embodiment of a cell balancing module according to the suggested principle.

FIG. 1 shows an exemplary embodiment of a cell balancing module according to the principle presented. This particular case shows a single mode module operation. The cell balancing module CBM comprises a local balancing unit LOC, a switching unit SW and several connector nodes. In particular, an interface SPI, VrefH, VrefL is used to input a coded reference voltage Vref or an external reference. Input nodes In1, In2, InN are used for connecting a stack of energy storage cells, preferably batteries BAT1, . . . , BATn. Respective charging nodes N1, N2, N3, N4 provide means to connect resistor R1 and power converter DCDC.

In more detail the local balancing unit LOC comprises a control logic LOG, a plurality of comparators COMP, and, but not necessarily, a digital-analog converter connected to multiplexers MULT. The control logic LOG constitutes a control unit of the local balancing unit LOC. It is, on one hand, connected to the interface SPI and receives the coded reference voltage Vref. It is also connected to the plurality of comparators COMP such as to control the comparators. However, it also receives in a bidirectional way output signals from the comparators COMP.

The control logic LOG also controls the switching unit SW. The batteries BAT1, . . . , BATn are connected to input nodes In1, In2, . . . , InN. During operation the control logic LOG controls the switching unit SW such that individual cell voltages VBAT1, . . . , VBATn are connected to the plurality of comparators COMP either at once or in a sequence one after another. An appropriate switching scheme results in selection of cell voltages VBAT1, . . . , VBATn of the stack of batteries which is provided to and processed by the control logic LOG.

Depending on the comparison the control logic LOG is designed to decide whether to charge or discharge a given battery BAT1, . . . , BATn out of the stack of batteries. Again, by controlling the switching unit SW the control logic LOG initiates charge balancing by electrically connecting a given one battery BAT1, . . . , BATn out of the stack of batteries to either the resistor R1 via charging nodes N1, N2 or to the power converter DCDC by charging nodes N2, N3. This way it is possible to either perform passive charge balancing by passively dissipating power via the external resistor R1 until a match with the coded reference Vref is achieved. Or, if a certain one of the batteries BAT1, . . . , BATn, is below the coded reference voltage that battery may actively receive charge from the DCDC power converter through switches in the control logic LOC. A combination of charging low cells through DC-DC and discharging high cells by resistor R1 is also possible to reach the coded reference voltage Vref in between the largest and smallest cell voltage VBAT1, . . . , VBATn in shorter time.

The comparators COMP provide a control signal indicating the amount of charge balance. That control signal may be directly proportional to the amount of charge balance or may be a binary signal. This way the amount of charge balance could be set to a fixed value by which charging and discharging is executed. Preferably, the DCDC power converter is adjustable via control nodes FD_OUT, FD_IN connected to the control logic LOG to adjust the amount of charge balance.

In an alternative or complement way to receive the coded reference voltage Vref the interface VrefH, VrefL is designed to receive an external analog or digital reference voltage. This external reference may, for example, be generated in a generator GEN and could either be a derivative of the total system voltage Vbat or any voltage within the safe cell voltage limits. In the embodiment shown the cell balancing module is, in addition, designed to receive an analog reference voltage via the interface VrefH, VrefL. By using the digital-analog converter DAC in conjunction with the multiplexers MULT the control logic LOG controls digital-to analog conversion such that an analog representation of the coded reference voltage VREF is applied to the comparators COMP. The voltage of each battery cell BAT1, . . . , BATn connected to the cell balancer module CBM is compared with the externally applied reference voltage Vref.

This coded reference voltage Vref can be any voltage within the safe operating voltage window of any energy storage cell. The coded reference voltage Vref can be applied as an analog signal or alternatively as digital representation from an external control unit CTRL like a microcontroller or control logic. In the latter case a local conversion to analog by a digital-to-analog converter DAC is performed.

Figure 2:
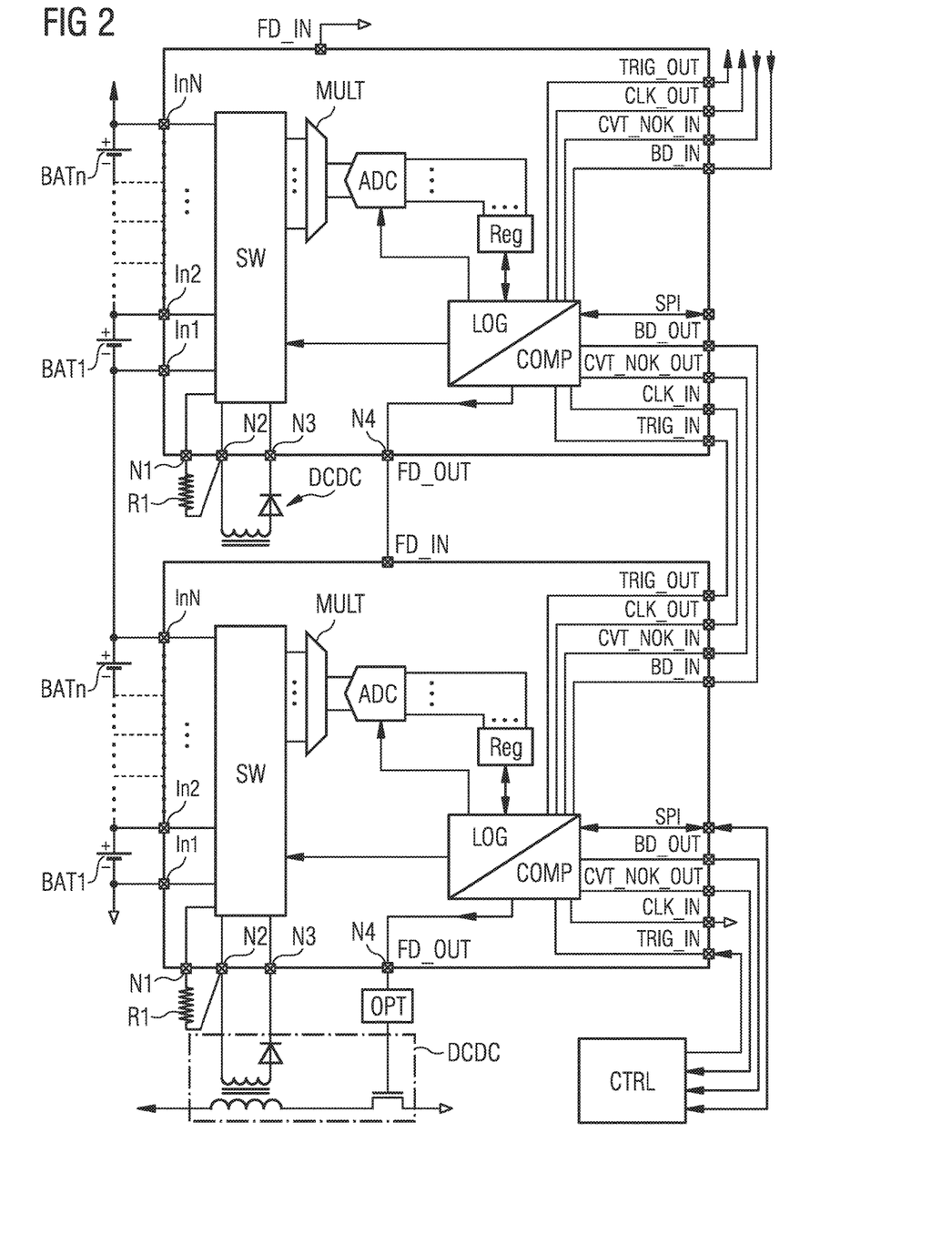
FIG. 2 shows a second exemplary embodiment of cell balancing modules according to the principle suggested.

FIG. 2 shows a second exemplary embodiment of cell balancing modules according to the principle presented. In this embodiment two cell balancing modules CBM are interconnected by a serial interface SPI. Each of the two cell balancing modules CBM is designed to perform a digital comparison. For this the cell balancing modules are equipped with an analog-to-digital converter ADC to convert cell voltages VBAT1, . . . , VBATn to digital and to compare with digital coded reference voltage Vref by comparators COMP.

Each cell voltage VBAT1, . . . , VBATn is measured sequentially through the switching logic SW controlled by the control logic LOG. The voltages are converted into digital form by a combination of multiplexer MULT and the analog-to-digital converter ADC. The comparison results are registered in a register set REG. To measure cell voltages VBAT1, . . . , VBATn simultaneously requires a number of n ADCs, where n stands for the number of cells supported by the balancer circuit. This case is not shown but may be implemented.

The digital representation of energy cell voltages VBAT1, . . . , VBATn are compared with the coded reference voltage Vref provided by a microcontroller or controller CTRL or the like. Based on the comparison result by the digital comparators COMP charge balancing is either done by active balancing or passive balancing using power converter DCDC or heat dissipation by resistor R1, respectively.

The cell balancing modules CBM are interconnected by a serial interface. The interface SPI may provide several control nodes BD_IN, BD_OUT, CVT_NOK_IN, CVT_NOK_OUT, CLK_IN, CLK_OUT, TRIG_IN, TRIG_OUT which depend on the type of interface, e.g. serial interface, to be used. The interface has at least twofold functionality. First, using the interface the coded reference voltage Vref is provided to each of the cell balancing modules CBM to be used. Second, using appropriate internal or external trigger signals TRIG_IN, TRIG_OUT, operation of the cell balancing units CBM and, in particular, charge balancing conducted by the control logic LOG may be synchronized and occurs simultaneously in each of the cell balancer modules CBM.

Figure 3:
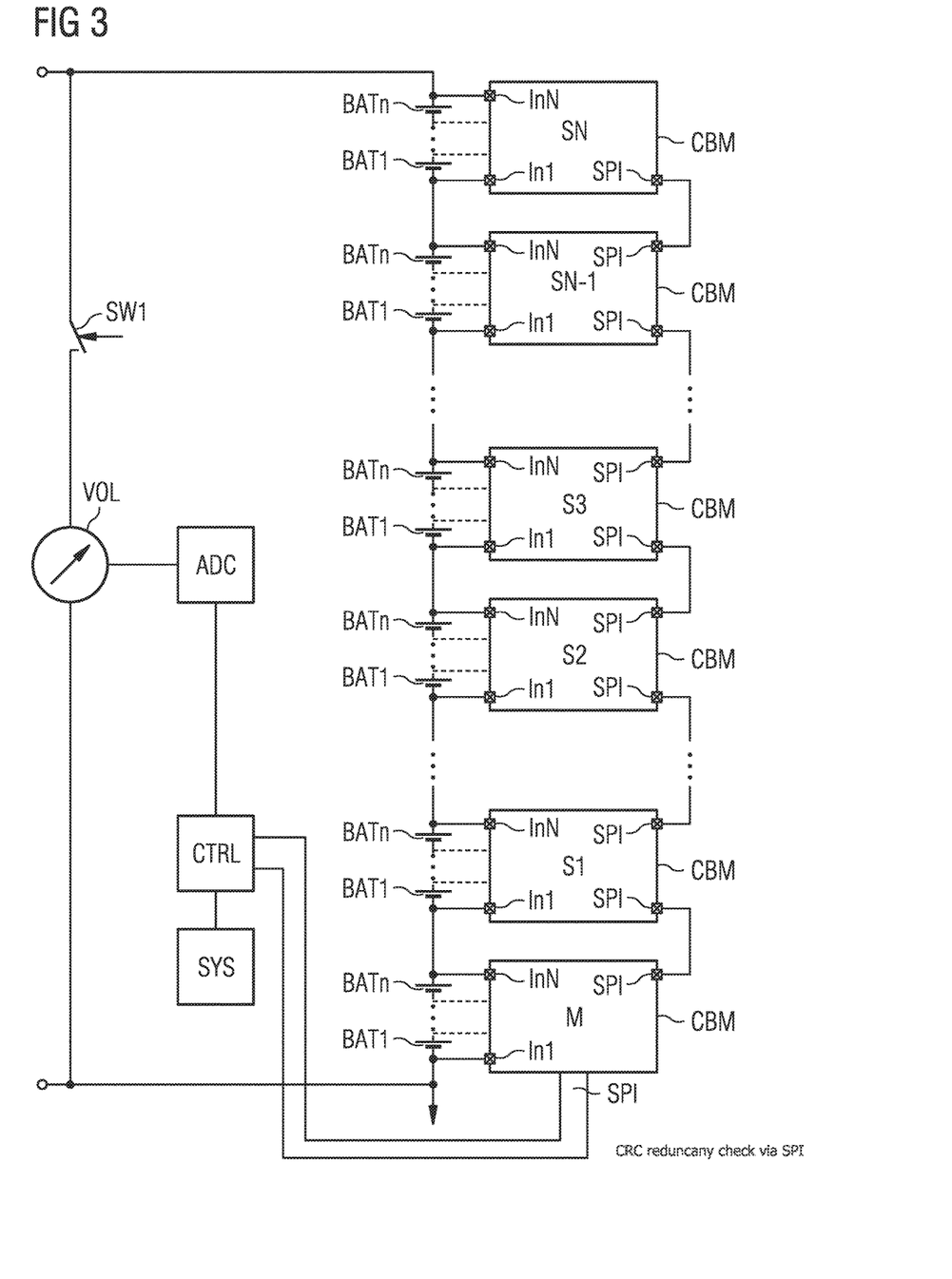
FIG. 3 shows an exemplary embodiment of a voltage balancer device and FIG. 4 shows a third exemplary embodiment of cell balancing modules according to the principle suggested.

FIG. 3 shows an exemplary embodiment of a voltage balancing device according to the principle presented. A voltage measurement circuit VOL connected to control switch SW1 is used to measure the overall battery voltage Vbat of the whole stack of batteries BAT1, . . . , BATn. The voltage measurement circuit VOL may comprise a voltage divider circuit and control switch SW1, as well as an analog-to-digital converter ADC. The ADC is connected to a battery controller CTRL which receives the measured total system voltage Vbat of the stack of batteries BAT1, . . . , BATn. The battery controller CTRL calculates from the total system voltage Vbat the coded reference voltage Vref. In particular, the coded reference voltage Vref can be calculated by dividing the total system voltage Vbat by the number of cells in the battery stack BAT1, . . . , BATn. Losses in the system may be considered during the calculation. The battery controller CTRL will, in the following, transmit the coded reference voltage Vref across all balancing modules CBM through via the interface, e.g. the serial digital interface. The battery controller CTRL is further connected to system controller SYS which, in turn, controls the battery controller CTRL.

The cell balancing modules CBM are interconnected in a daisy chain fashion and are designed to receive control signals for synchronous clocking of all modules, to simultaneously enable and/or disable the balancing procedure and to indicate when all cells are of equal voltage, i.e. reached the coded reference voltage Vref.

There are at least two operating modes in which the daisy chained cell balancing modules CBM are operated. In a first operating mode which is triggered by the battery controller CTRL, the coded reference voltage Vref is sent to all cell balancing modules CBM. Once the information is received at all destination cell balancing modules CBM and error-free reception is acknowledged by all modules CBM, for example by cyclic redundancy check, CRC, the electronic switches of the switching unit SW switch to a second operating mode. In this mode charge balancing is started, possibly synchronized through the internal or external chained trigger TRIG_IN, TRIG_OUT and chained clock CLK_IN, CLK_OUT. The reliability and data integrity of interface communication is preferably maintained by CRC of required polynomials.

The interface communication has one master M and many slave modules S1, S2, S3, . . . , SN-1, SN. Each slave module S1, S2, S3, . . . , SN-1, SN has a unique address which is allocated during configuration by a special address allocation procedure initiated by the master M. This allocation may preferably be performed by the control logic LOG. In the address allocation procedure the master module M will send the top device address and each slave module will decrement this address until e.g. a logic zero is seen on the interface SPI.

The battery controller CTRL will transmit the calculated coded reference voltage Vref to the master module M via the interface, e.g. by means of a standard bus interface. The master module M then initiates further broadcast by write operation and transmits the coded reference voltage Vref to all slave modules S1, S2, S3, . . . , SN-1, SN. This way all slave modules S1, S2, S3, . . . , SN-1, SN receive the coded reference voltage Vref. The coded reference voltage Vref may be converted to an analog voltage by the local digital-to-analog converter DAC in each module CBM and is simultaneously compared with each cell voltage VBAT1, . . . , VBATn of a stack of batteries. In the following charge balancing is performed either by an active or passive balancing technique as described above.

By using the interface according to a serial protocol or standard the transmission and reception of the coded reference voltage to the cell balancing module is largely insensitive to electromagnetic interferences and disturbances. This is especially important when using the stack of energy storage cells in an electronic noisy environment such as in an electric vehicle. Simultaneous comparison further improves reliability of charge balancing by the voltage balancer device presented. This way large and rather complex stacks of energy storage cells BAT1, . . . , BATn can be operated to ensure long battery life, healthiness and safety.

The higher robustness with respect to interference is due to the fact that once serial communication for sending the reference voltage Vref is completed, acknowledged (in fact sending reference Vref could be repeated multiple times) and stored in the cell balancing modules CBM, the system switches off communication, i.e. first operating mode, and charge balancing, i.e. second operating mode, starts. Balancing in this mode works autonomously on trigger TRIG_IN, TRIG_OUT without the need to continue with error prone serial communication. The balancing modules CBM are preferably synchronized in this second mode by chained trigger TRIG_IN, TRIG_OUT and chained clocking CLK_IN, CLK_OUT to enable simultaneous comparison of cell voltages VBAT1, . . . , VBATn with the reference voltage Vref. This way erroneous balancing decisions are suppressed, caused e.g. by common mode disturbances on the chained energy storage cells BAT1, . . . , BATn.

Figure 4:
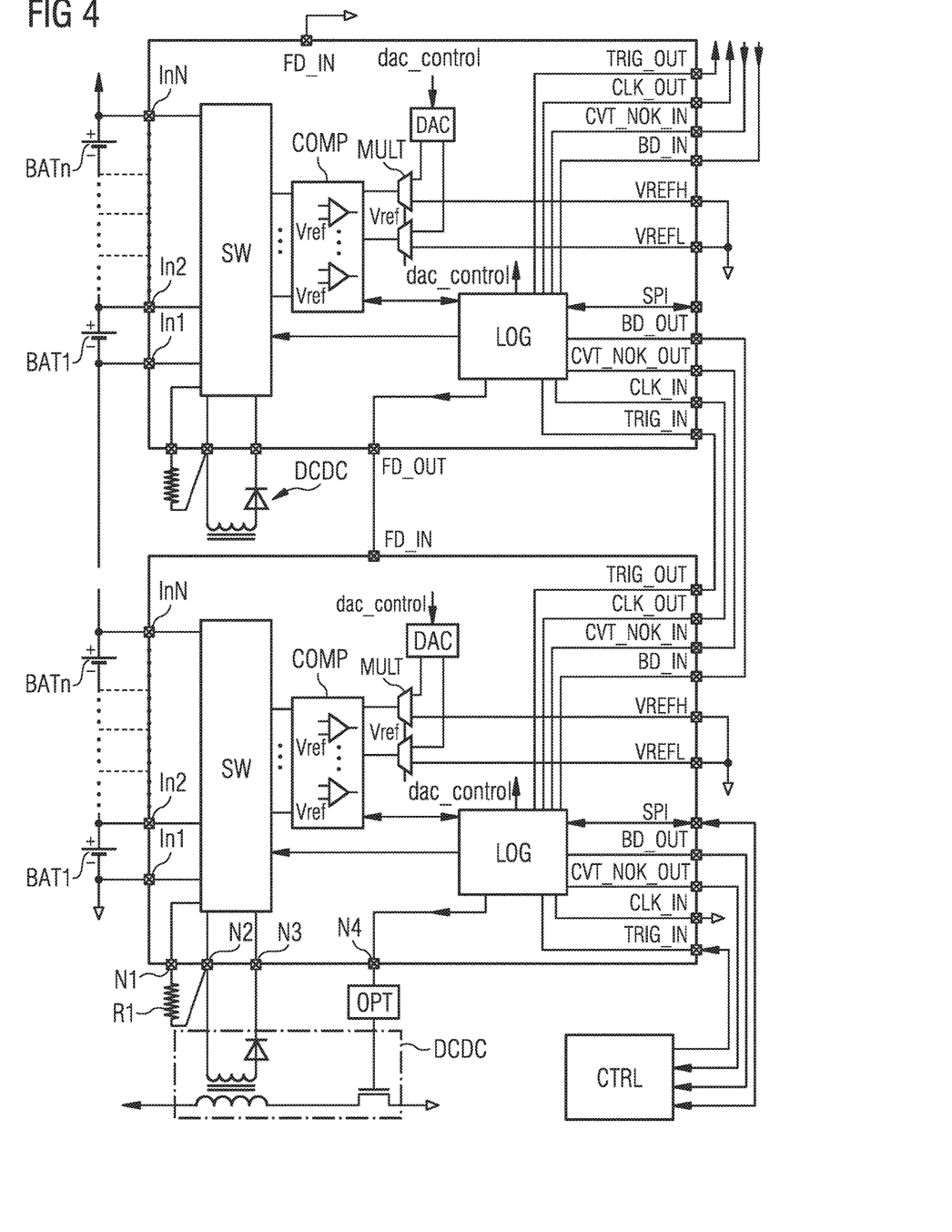

FIG. 4 shows a third exemplary embodiment of cell balancing modules according to the principle presented. In this particular embodiment two cell balancing modules CBM each have multiple comparators COMP for analog comparison and corresponding digital-to-analog converter DAC as discussed with respect to FIG. 1. The cell balancing modules CBM are interconnected in a daisy chain as master M and slave S as described in FIGS. 2 and 3. Thus, function of said daisy chain is analogous. Operation of a single module corresponds to the description in FIG. 1.

Figure 5:
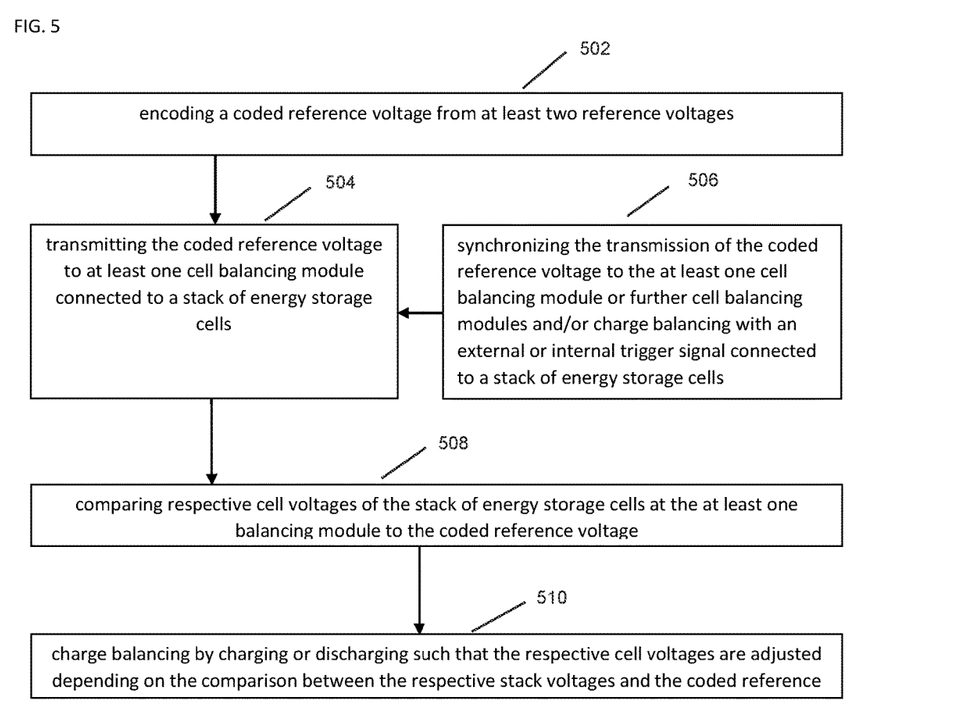
FIG. 5 shows an example process for voltage balancing of a stack of batteries.

FIG. 5 shows an example process for voltage balancing of a stack of batteries. At block 502, a coded reference voltage is encoded from at least two reference voltages. At block 504, the coded reference voltage is transmitted to at least one cell balancing module connected to a stack of energy storage cells. At block 506, synchronizing the transmission of the coded reference voltage to the at least one cell balancing module or further cell balancing modules and/or charge balancing with an external or internal trigger signal takes place. At block 508, respective cell voltages of the stack of energy storage cells at the at least one balancing module are compared to the coded reference voltage. At block 510, the process charge balances by charging or discharging such that the respective cell voltages are adjusted depending on the comparison between the respective stack voltages and the coded reference voltage.

REFERENCE NUMERALS

ADC analog-to-digital converter
BAT1 energy storage cell
BATn energy storage cell
BD_IN serial control node
BD_OUT serial control node
CBM cell balancing module
CLK_IN serial control node
CLK_OUT serial control node
COMP comparator
CTRL control unit
CVT_NOK_IN serial control node
CVT_NOK_OUT serial control node
DAC digital-to-analog converter
dac_control control signal
DCDC power converter
FD_IN control node
FD_OUT control node
GEN generator
In1 input node
In2 input node
InN input node
loc local balancing unit
LOG control logic
N1 charging/discharging node
N2 charging/discharging node
N3 charging/discharging node
N4 charge control node
M master module
Mult multiplexer
OPT galvanic isolation element
R1 resistor
Reg register
S1 slave module
S2 slave module
S3 slave module
SN slave module
SN-1 slave module
SPI interface
SW switching unit
SW1 switch
SYS micro-controller
TRIG_IN trigger signal
TRIG_OUT trigger signal
Vbat total system voltage
VBAT1 cell voltage
VBATn cell voltage
VOL voltmeter
Vref coded reference voltage
VREFH external reference voltage
VREFL external reference voltage

The invention claimed is:
1. At least one cell balancing module for voltage balancing of a plurality of stacks of energy storage cells, comprising:
   an interface to input a coded reference voltage derived from at least two reference voltages, wherein each cell balancing modules is arranged to locally generate a local reference voltage from the coded reference voltage
   input nodes for connecting at least one of the stacks of energy storage cells;
   a switching unit connected to each of the input nodes; and
   at least one local balancing unit which is coupled to the switching unit and to the interface and which is designed to compare the local reference voltage with cell voltages of the at least one of the stacks of energy storage cells to be connected, and designed to charge balance by charging or discharging the at least one of the stacks of energy storage cells to be connected depending on the comparison of the local reference voltage and the cell voltages, wherein the coded reference voltage is a digital representation of a reference voltage derived from a total system voltage of the plurality of stacks of energy storage cells, wherein the interface is a serial interface, and the coded reference voltage is simultaneously sent, as a digital representation, to the at least one local balancing unit via the serial interface, wherein a number of n cell balancing modules are interconnected by way of a daisy chain via their respective interfaces, wherein local generation involves digital-to-analog conversion and the charge balance depends on an analog comparison between the local reference voltage and the cell voltages, and wherein each cell balancing module is arranged to acknowledge reception of the coded reference voltage by redundancy check.

2. The at least one cell balancing module according to claim 1, further comprising means to synchronize operation of the at least one local balancing unit depending on an external trigger signal to be applied via the interface.

3. The at least one cell balancing module according to claim 1, wherein the interface comprises input and output means to establish the daisy chain connection to further cell balancing modules.

4. The at least one cell balancing module according to claim 1, wherein the at least one local balancing unit comprises means to derive an amount of charge balance of the at least one of the stacks of energy storage cells such as to determine, based on a balance voltage provided at the output of the at least one comparator, whether to charge or discharge the at least one of the stacks of energy storage cells.

5. The at least one cell balancing module according to claim 1, wherein the coded reference voltage is received and decoded locally by the at least one local cell balancing unit.

6. The at least one cell balancing module according to claim 1, wherein the at least one local cell balancing unit comprises multiple local cell balancing units implemented as a network of serially-connected integrated circuits.

7. The at least one cell balancing module according to claim 1, wherein the coded reference voltage is locally converted into analog form, and wherein the cell voltages in analog form are compared with the local reference voltage in analog form.

8. The at least one cell balancing module according to claim 1, wherein the digital representation of the coded reference voltage includes coding for error-free reception at the at least one local cell balancing unit.

9. The at least one cell balancing module according to claim 8, wherein the error-free reception corresponds to cyclic redundancy check.

10. The at least one cell balancing module according to claim 1, wherein the interface is a serial peripheral interface.

11. The at least one cell balancing module according to claim 1 or 10, wherein the at least one local balancing unit comprises:
at least one comparator which is coupled to the switching unit via a first input to enter the cell voltages of the at least one of the stacks of energy cells to be connected and via a second input to enter the local reference voltage, wherein the comparator compares the local reference voltage, with the cell voltages of the at least one of the stacks of energy storage cells to be connected; and
a control logic which is connected to the interface, to an output of the at least one comparator and to the switching unit in which the control logic controls the switching unit such as to electrically connect the cell voltages to the first input of the comparator, respectively.

12. The at least one cell balancing module according to claim 11, wherein the at least one local balancing unit comprises a digital-to-analog converter, which is connected to the second input of the at least one comparator and connected to the control logic via a control channel, and which is designed to convert the coded reference voltage into an analog local reference voltage to be provided at the second input of the at least one comparator, or
wherein the at least one local balancing unit comprises an analog-to-digital converter, which is coupled to the switching unit such as to convert the cell voltages into digital local cell voltages to be provided at the first input of the at least one comparator, and which is controllably connected to the control logic.

13. A voltage balancer device for voltage balancing of one or more stacks of energy storage cells, comprising:
at least one cell balancing module according to claim 1; and
means for coding the coded reference voltage connected to the interface of the at least one cell balancing module.

14. The voltage balancer device according to claim 13, wherein charging nodes are connected
to a power converter to charge, or
to a resistor to discharge the one or more stacks of energy storage cells.

15. The voltage balancer device according to claim 13, wherein the means for coding a coded reference voltage comprise:
voltage measurement circuit designed to determine total system voltage of the plurality of stacks of energy storage cells to be connected;
an analog-to-digital converter connected to the voltage measurement circuit and designed to convert the total system voltage into a digital representation; and
a control unit connected to the analog-to-digital converter and designed to code the coded reference voltage based on the digital representation and to be transmitted via a means for transmitting.

16. The voltage balancer device according to claim 13, wherein
a first cell balancing module is designed to be a master module in the daisy chain of n cell balancing modules,
the other cell balancing modules are designed to be slave modules, and
the daisy chain connection between the master module and slave modules is a serial peripheral interface.

17. The voltage balancer device according to claim 16, wherein the master module is designed to simultaneously
send the coded reference voltage to the slave modules via the daisy chain, and
synchronize charge balancing in the charge balancing modules by controlling the slave modules using a trigger signal to be applied via the respective interfaces.

18. A method for voltage balancing for voltage balancing of a plurality of stacks of energy storage cells, comprising:
encoding a coded reference voltage from at least two reference voltages, wherein each cell balancing modules is arranged to locally generate a local reference voltage from the coded reference voltage
transmitting the coded reference voltage to at least one cell balancing module connected to at least one of the stacks of energy storage cells;

comparing respective cell voltages of at least one of the stacks of energy storage cells at the at least one cell balancing module to the local reference voltage; and charge balancing by charging or discharging such that the respective cell voltages are adjusted depending on the comparison between the respective stack voltages and the local reference voltage, wherein the coded reference voltage is a digital representation of a reference voltage derived from a total system voltage of the plurality of stacks of energy storage cells, wherein the coded reference voltage is simultaneously sent, as a digital representation, to the at least one cell balancing module via a serial interface, and wherein a number of n cell balancing modules are interconnected by way of a daisy chain via their respective interfaces, wherein local generation involves digital-to-analog conversion and the charge balance depends on an analog comparison between the local reference voltage and the cell voltages, and wherein each cell balancing module is arranged to acknowledge reception of the coded reference voltage by redundancy check.

19. The method for voltage balancing according to claim 18, further comprising:

synchronizing the transmission of the coded reference voltage to the at least one cell balancing module or to further cell balancing modules, and charge balancing with an external or internal trigger signal.

20. At least one cell balancing module for voltage balancing of a plurality of stacks of energy storage cells, comprising:

an interface to input a coded reference voltage derived from at least two reference voltages, wherein each cell balances modules is arranged to locally generate a local reference voltage from the coded reference voltage input nodes for connecting at least one of the stacks of energy storage cells;

a switching unit connected to each of the input nodes; and at least one local balancing unit which is coupled to the switching unit and to the interface and which is designed to compare the local reference voltage with cell voltages of the at least one of the stacks of energy storage cells to be connected, and designed to charge balance by charging or discharging the at least one of the stacks of energy storage cells to be connected depending on the comparison of the local reference voltage and the cell voltages, wherein the coded reference voltage is a digital representation of a reference voltage derived from a total system voltage of the plurality of stacks of energy storage cells, wherein the interface is a serial interface, and the coded reference voltage is simultaneously sent, as a digital representation, to the at least one local balancing unit via the serial interface, wherein a number of n cell balancing modules are interconnected by way of a daisy chain via their respective interfaces, wherein local generation involves analog-to-digital conversion and the charge balance depends on a digital comparison between the local reference voltage and the cell voltages, and wherein each cell balancing module is arranged to acknowledge reception of the coded reference voltage by redundancy check.

21. The at least one cell balancing module according to claim 20, wherein the cell voltages are converted into digital form, and wherein the converted cell voltages in digital form are compared with the local reference voltage in digital form.

* * * * *